(12) United States Patent
Kobayashi et al.

(10) Patent No.: US 7,996,407 B2
(45) Date of Patent: Aug. 9, 2011

(54) SYSTEM, METHOD AND COMPUTER EXECUTABLE PROGRAM FOR INFORMATION TRACKING FROM HETEROGENEOUS SOURCES

(75) Inventors: Mei Kobayashi, Yokohama (JP); Raylene Kay Yung, Torrance, CA (US)

(73) Assignee: International Business Machines Corporation, Armonk, NY (US)

(*) Notice: Subject to any disclaimer, the term of this patent is extended or adjusted under 35 U.S.C. 154(b) by 767 days.

(21) Appl. No.: 12/018,652

(22) Filed: Jan. 23, 2008

(65) Prior Publication Data

US 2009/0006377 A1    Jan. 1, 2009

(30) Foreign Application Priority Data

Jan. 23, 2007  (JP) .................................. 2007-12618

(51) Int. Cl.
    *G06F 17/30*    (2006.01)
(52) U.S. Cl. ........................ 707/741; 707/738
(58) Field of Classification Search ........................ None
    See application file for complete search history.

(56) References Cited

U.S. PATENT DOCUMENTS

2008/0294651 A1* 11/2008 Masuyama et al. ........... 707/100

FOREIGN PATENT DOCUMENTS

| JP | PUPA 2001-117930 | 4/2001 |
|---|---|---|
| JP | 2001-312505 | 9/2001 |
| JP | 2002-024268 | 1/2002 |
| JP | 2003-141160 | 5/2003 |

OTHER PUBLICATIONS

Kobayashi, et al, "Vector Space Models for Search and Cluster Mining", Survey of Text Mining II, Springer, London 2008.
Yamashita, Y., et al, "Detecting and Tracking the Evolution of Events", Technical Report of Information Processing Society of Japan, vol. 2002, No. 101, pp. 31-38, Nov. 6, 2002.

* cited by examiner

*Primary Examiner* — Baoquoc To
(74) *Attorney, Agent, or Firm* — William Stock; Anne Vachon Dougherty

(57) ABSTRACT

A system for information clustering comprising a data accumulation part for accumulating documents in a document repository, the documents having loosely related attributes, and defining a cluster between the documents being time sliced so as to define chunks of the documents; a vector space generation part for generating document-keyword vectors, the document-keyword vectors consisting of sparse numeral values depending on presence of key words; a dimension reduction part for reducing dimensions of the keywords to create a dimension reduction matrix of the document-keyword matrix; a centroid vector determination part for generating a centroid vector of the cluster, the centroid vectors being defined from keywords and weight of documents within the cluster; and an item repository for storing the centroid vectors together with the keywords and the weights of the centroid vector.

18 Claims, 14 Drawing Sheets

600

Keyword Counts Vector — 602

| 1 | 2 | 0 | 0 | 1 | 0 | 1 | 1 | 1 | 0 | 0 | 1 | 1 | 0 |

Tf-idf Weighted Vector — 604

| 3.822 | 5.255 | 0 | 0 | 2.631 | 0 | 4.509 | 3.740 | 0 | 0 | 2.794 | 2.372 | 0 |

Normalized Vector — 606

| 0.388 | 0.533 | 0 | 0 | 0.267 | 0 | 0.458 | 0.379 | 0 | 0 | 0.283 | 0.240 | 0 |

Relevancy $= \cos\theta = \sum_{i=1}^{n}(X_i \times Y_i)$,
Where the Document and Query Vectors
have been Normalized so that $|X|=|Y|=1$.

704 d.1    Documents    d.8000

2nd comp.

Query Vector

708

| Component Keywords |
| --- |
| 0.359124 # energy |
| 0.267695 # solar |
| 0.249761 # power |
| 0.153877 # panel |
| 0.145951 # fuel |

| Distance to Component | Document ID | Title |
|---|---|---|
| 0.4925455495433209 | # ID: 2141 | Generating Power for the Plants |
| 0.4711832693649915 | # ID: 1932 | Saving Energy |
| 0.4709178730942758 | # ID: 2251 | Generate Solar to Consume Less Fossil Fuels |
| 0.4709178730942758 | # ID: 2542 | IBM can go Green |
| 0.4709178730942758 | # ID: 4083 | IBM Becoming a Role Model |
| 0.4709178730942758 | # ID: 4597 | More Solar Energy |
| 0.4709178730942758 | # ID: 4607 | Maximizing Existing Resources |
| ... | ... | ... |

| Chunk # | Weight and Keywords of Centroid |
|---|---|
| 1 | 0.2667382117118256,#panel,0.22935564930622554,#shield ∘ ∘ ∘ |
| 2 | ∘ ∘ ∘ |
| 3 | ∘ ∘ ∘ |
| ⋮ | ⋮ |

1202      1204

SYSTEM, METHOD AND COMPUTER EXECUTABLE PROGRAM FOR INFORMATION TRACKING FROM HETEROGENEOUS SOURCES

FIELD OF THE INVENTION

The present invention relates to information tracking from a data source comprising various expressions and terms being loosely related each other, and more particularly, the present invention relates to a system, a method and a program for information tracking from heterogeneous sources comprising various expressions and terms being loosely related each other.

BACKGROUND OF THE INVENTION

Information retrieval from a database is popularly used in various fields. Information retrieval techniques may be implemented using various algorithms such as a tree model or vector space model, etc. Among various methods, the vector space model has been used for retrieving, clustering and tracking the information from very large databases.

Conventionally, the information retrieval depends on the vector space model usually applied to documents with rigidly determined keywords and with a standard format for generating keyword-document vectors. Documents including different keywords which refer to the same contents or semantics tend to pose problem when forming clusters. In the commercial or other sophisticated databases, keywords may be rigidly determined or selected using proper rules when the documents are accumulated in the database. However, a database accumulating chat, mail, free postings for particular issues or on-line discussion flows may comprise documents or information with unlikely or different keywords, though the keyword sets suggest the same issues, topics, or items by using semantics, synonyms, or parts of the key words.

In such information, typical cluster search algorithms perform badly in the formation of clusters because the keywords are different while the keywords relate to the same items. Also, information tracking in such loosely controlled and uncontrolled documents suffers similar difficulty in identifying focused topics or items with respect to time evolution of the documents.

In addition, typical vector space model algorithms consume huge hardware resources such as CPU time and memory resources, and sometimes the computation of the dimension reduction consumes long CPU time. The cluster formation based on the vector space model further requires extra algorithms for generating clusters. In addition, such cluster formation may not have sufficient relevancy to the items that change or evolve with respect to elapsed time.

Even in a database in which documents are accumulated with respect to time evolution with the documents originating from heterogeneous sources, it is useful and necessary to retrieve, search, or track focused items or matters of the documents with respect to the time dependent accumulation of the documents. Such an information retrieval algorithm will provide some predictions of items included in the documents with respect to time lapse of the accumulation.

For example, such analysis may be useful to predict stock price prediction, product-trend prediction, market research, trend search of academic or patent publication or item prediction which will be focused in the next stage depending on the accumulated document and/or text transmitted between some parties, but not limited thereto.

Detailed algorithms of the vector space model and their particular implementation, which supports basis technologies of the present invention, are reviewed in the following patent and non-patent literature: Japanese patent application JP2001-312505, JP2002-024268, JP2002-030222, JP2003-141160 and non-patent literature including an article by Mei Kobayashi, Masaki Aono and Michael E. Houle, entitled "Mining overlapping major and minor clusters in massive databases", Invited Talk, Industry Day, Special Technologies Workshop #6, organized by Noel Barton, International Conference on Industrial and Applied Mathematics (ICIAM), Sydney, Australia, 2003 and an article by Mei Kobayashi and Masaki Aono, Vector space models for search and cluster mining, in Michael Berry (ed.), entitled "Survey of Text Mining: Clustering, Classification, and Retrieval", Springer, N.Y., USA, 2003, pp. 101-122.

SUMMARY OF THE INVENTION

As described above, a system, a method and a computer executable program which are able to determine clusters in the documents having loosely related keywords with high relevancy are needed. Also needed are a system, a method, and a computer executable program which are capable of computing such clusters without consuming huge hardware resources such as CPU time and memory resources to make the computation of the item tracking efficient and high speed.

It is, therefore, an object of the present invention to provide a system, method, and a computer executable program for retrieving information from heterogeneous sources comprising various expressions and terms being loosely related to each other.

Another object of the present invention is to provide a system, method, and a computer executable program for tracking focused items in clusters of documents which are accumulated in a database with respect to the time elapse for data accumulation.

A further object of the present invention is to provide a system, method, and a computer executable program for effectively tracking relevantly focused items as keyword sets derived from a particular cluster of documents with respect to the time evolution.

In order to address the above objects, the present invention uses vector space modeling of the documents accumulated in a database. The documents accumulated in the database are provided with time slices or chunks containing plural documents. Such time slices or chunks may be done per a predetermined time duration or per accumulation of a predetermined numbers of the documents to generate the vector space model.

The generated vector space models are subjected to dimension reduction processing including singular value decomposition and are subsequently subjected to dimension reduction so as to obtain a principal component of the document-keyword matrix. The principal component is formed from a line of the dimension reduction matrix across the documents and resumes keywords having the same order with respect to results of the singular value decomposition. Then, so-formed principal components provide excellent values in clustering and/or tracking between the time slices and/or chunks.

Further, the keyword set in the principal component is used as a first query vector to the document-keyword matrix and/or dimension reduction matrix. The projection of the first query retrieves a relevant document, i.e., a principal document to the principal component. Keywords in the principal document are again used as a second query to the document-keyword matrix and/or dimension reduction matrix to retrieve documents for candidates for a cluster; the document having the most significant distance is referred to herein as a principal document. Also any other high-ranking principal document from the first query may be used as a second query.

Keywords and weights included in the cluster define centroid vectors of the major cluster after appropriate averaging. The centroid may be determined by weights of particular keywords and the keywords appeared in the core documents through a simple arithmetic average algorithm or any other known averaging method such as a moving average.

The centroid vectors of each of the time slices or chunks are then computed to obtain the time dependent evolution of the centroid of the corresponding clusters with respect to the elapsed time.

In another embodiment, the vector space model referred to as a sub-chunk may be generated as well as sequential time slices and/or sequential chunks. The documents in sub-chunks overlap two subsequent time slices and/or chunks. When the sub-chunks are prepared, the trace or tracking may be ensured when the major item suddenly changes in the accumulated documents.

According to the present invention, the information tracking of the loosely related documents may be improved as follows:
(1) Reduce data into manageable size overlapping slices, based on a time stamp to enable fast vector space modeling followed by the principal component analysis-based dimensional reduction, and then the computation facilities are reduced;
(2) Use the principal components as the query to identify documents in major clusters such that effective and prompt search of the cluster are attained;
(3) Use retrieved documents (from step 2) to find core documents in the cluster, their average approximating the cluster centroid. The keyword weights in the centroid vector describe the main topics addressed by documents in the cluster; and
(4) Refinement of the centroid vectors may be allowed; the first approximation is adopted as an average of documents in the cluster core, and then a refined approximation for the centroid vectors may be computed from the new document set until the set of retrieved documents stabilizes, until a fixed number of iterations has occurred or until system termination.

Now, the present invention will be explained in detail with referring to particular embodiments depicted as drawings.

BRIEF DESCRIPTION OF THE DRAWINGS

FIG. 9 shows the result of the first query.

DETAILED DESCRIPTION OF THE INVENTION

Section I: Computer System

Figure 1:
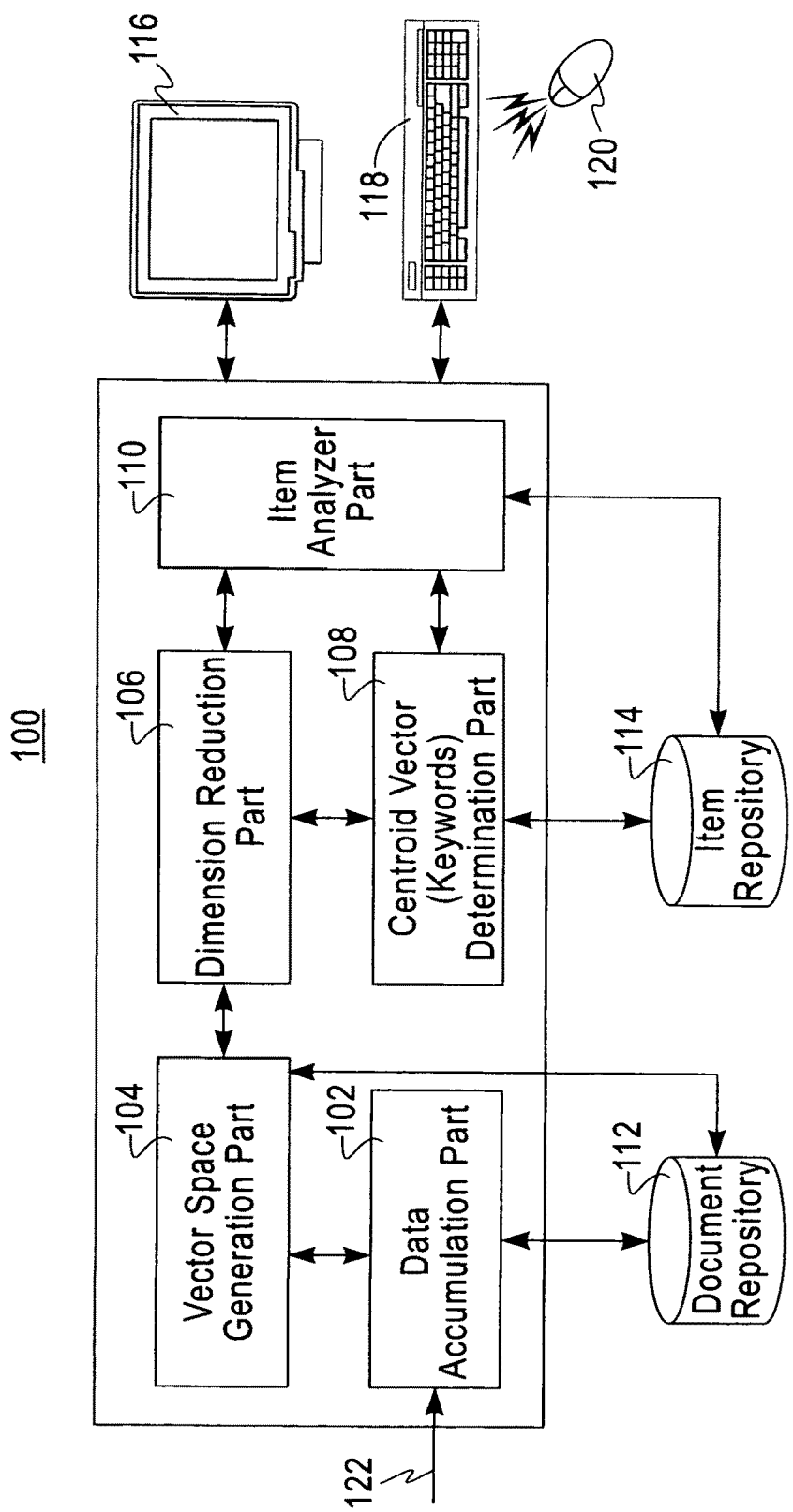
FIG. 1 shows general functional blocks of the system 100.

Referring to FIG. 1, general functional blocks of the system 100 are illustrated. The system 100 may be constructed by well known computer architectures which comprise a central processing unit (CPU), memories such as cache, RAM and/or ROM, a hard-disk drive and bus lines interconnecting hardware modules. The system 100 may also be operated by well known operating systems such as WINDOWS (trademark), UNIX (trademark), or LINUX (trademark) and can execute application programs written by object oriented programming language and/or legacy programming languages such as C, C++, JAVA, RUBY, PERL, etc.

The system 100 comprises the data accumulation part (DAP) 102, the vector space generation part (VSGP) 104, and dimension reduction part (DRP) 106. The DAP102 may be constructed by various application modules such as a mailer, a chat application, and/or access-log analysis software implemented in a particular server and may be supported by database software such as DB2 (trademark), ORACLE (trademark), MySQL (trademark), etc. so as to retrieve queried documents.

The DAP 102 accumulates information from the network 122 such as the Internet, a LAN (local area network), or a WAN (wide area network). The information may include text documents such as mail, chat transmissions, log data, multimedia documents with appropriate text data, and/or audio data. When the information includes audio data, the audio data may be converted into text data by appropriate software such as VIA VOICE (trademark), in order to generate the vector space model.

The information accumulated by the data accumulation part 102 generally has the character that the keywords included therein loosely relate to each other and relate to some focused items such as health, money, food, the environment, games, plans, etc. The information is typically created without particular regulation and the same item may be described or expressed in different keywords while including loose relevancy.

The DAP 102 accumulates the information with respect to the elapsed time in the document repository 112 and defines time slices or chunks for the information. The time slice or chunk may be created by any rule in the present embodiment. For example, the time slice or chunk may be created for a predetermined time span; or, alternatively, the time slice or chunk may be created for predetermined quantities of information.

The VSGP 104 may be constructed by the standard procedure for keyword extraction and stemming described in standard textbooks on the subject (R. K. Belew, "Finding Out About", Cambridge Univ. Press, Cambridge, UK, 2001). The VSGP 104 is implemented with a parser developed at the IBM Research that extracts keywords, deletes common stopwords, and conducts parts-of-speech tagging. The details of the parser can be found in an article by Mary S. Neff, Roy J. Byrd and Branimir K. Boguraev, entitled "The Talent system: TEXTRACT architecture and data model," Natural Language Engineering, Volume 10, 2004, pp. 307-326. The VSGP 104 may be implemented to use single word tokens (nouns, verbs, and adjectives), but is not limited thereto, such that any other rule or implementation embodiment may be possible. In a preferred embodiment, a standard type of term frequency inter-document frequency (tf-idf) weighting may be implemented in the VSGP 104 followed by normalization, as detailed by Christopher D. Manning and Hinrich Schuetze, in "Foundations of Statistical Natural Language Processing," MIT Press, Cambridge, Mass. USA, 1999.

The DRP 106 executes the dimension reduction of the document-keyword matrix using a singular value decomposition algorithm to generate a dimension reduction matrix of the document-keyword matrix. In the preferred embodiment, the singular value decomposition algorithm of a numerical package is applied as detailed by Doug Rohde, SVDLIBC, version 1.34, which can be found on the internet at tedlab-.mit.edu:16080/~dr/SVDLIBC/, which is based on the Lanczos algorithm to compute the partial singular value decomposition of the document-keyword matrix.

The resulting dimension reduction matrix is stored in a particular repository such as the hard-disk drive. The dimension reduction matrix is then retrieved to the centroid vector (keyword set) determination part (CVDP) 108 so as to determine centroid vectors of the particular time slice or chunk. The detail of the determination of the centroid vector will be explained hereinafter. The resulting centroid vectors of each time slice or chunk and also sub-chunks are stored in the item repository 114 for tracking the time evolution of the items that are relevant to the documents. The item analyzer part 110 retrieves the centroid vectors of each time slice or chunk in response to instructions from the keyboard 118 and/or a mouse 120 and performs the analysis of the centroid vectors. The results of the analysis of the item analyzer part 110 are transmitted to the display device 116 for displaying the result on a display screen.

Section II: Algorithm of the Cluster Finding and Tracking

Figure 2:
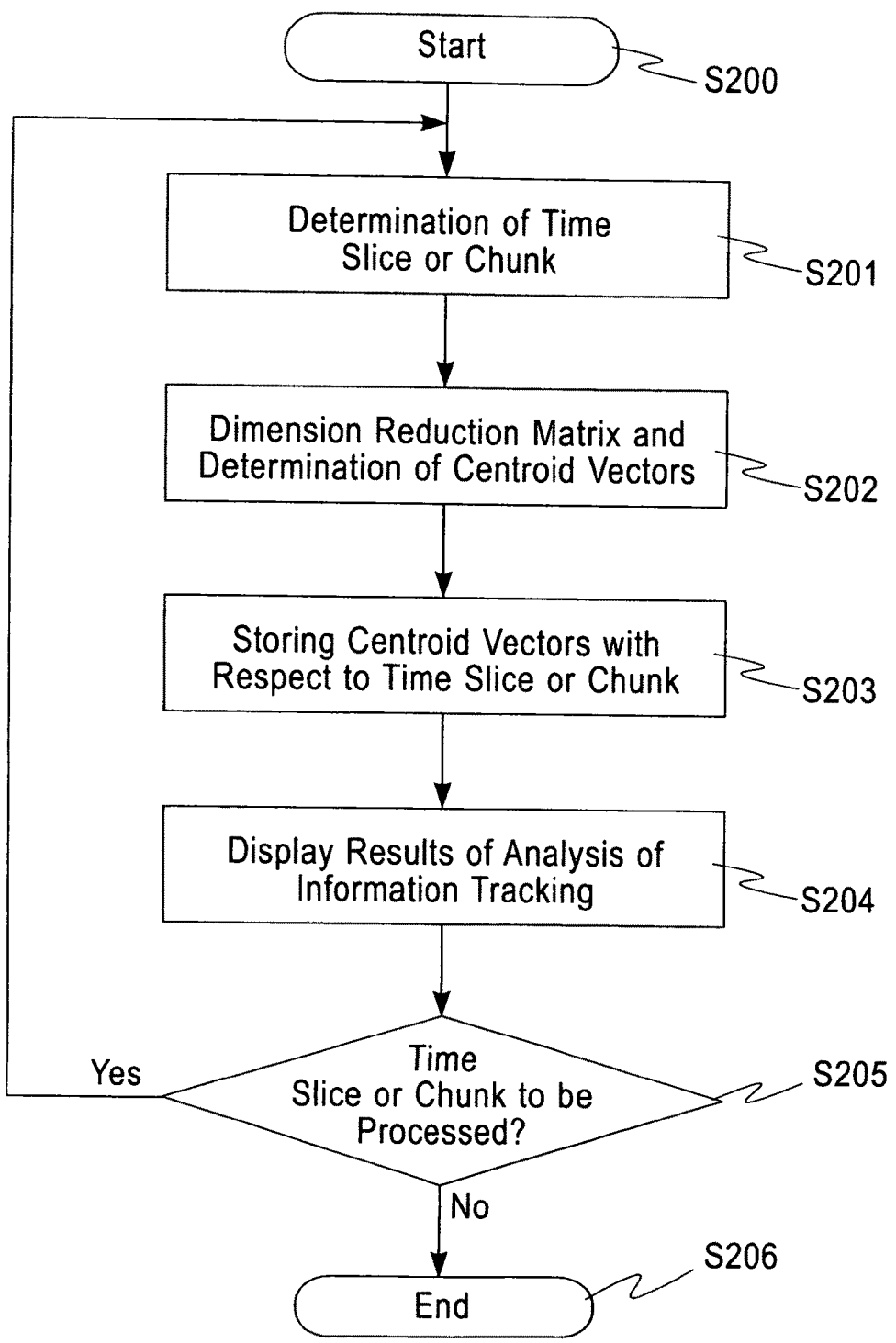
FIG. 2 shows the preferred embodiment of the method.

With referring to FIG. 2, the preferred embodiment of the method is illustrated. The method starts at step S200 and in the Step S201, the time slice or chunk of the information is determined. In the step S202, the method executes the determination of cluster in the time slice or chunk using the vector space model and the dimension reduction algorithm so as to determine the centroid vectors. The reason why the dimension reduction algorithm is preferred is that the document-keyword vector has sparse elements so that omission of minor keywords improves the computation efficiency. The centroid vector refers herein to the vector of keyword-weight for the particular cluster defined in the documents within the time slice or chunk.

In Step S203, the determined centroid vectors are stored in the item repository 114 for tracking of the item analyzer part 110. In step S204, the centroid vectors are retrieved from the item repository 114 and the results of the analysis are displayed on the display device 116. In step S205, the method determines whether or not there is a new time slice or chunk to be processed. When a new time slice or chunk still remains, the method reverts to step S201 and repeats the processes from step S202 to step S205 until there is no remaining time slice or chunk to be processed (i.e. the last time slice or chunk in the document repository 112 has been processed). When there is no the time slice or chunk to be processed, the method is terminated at step S206.

Figure 3:
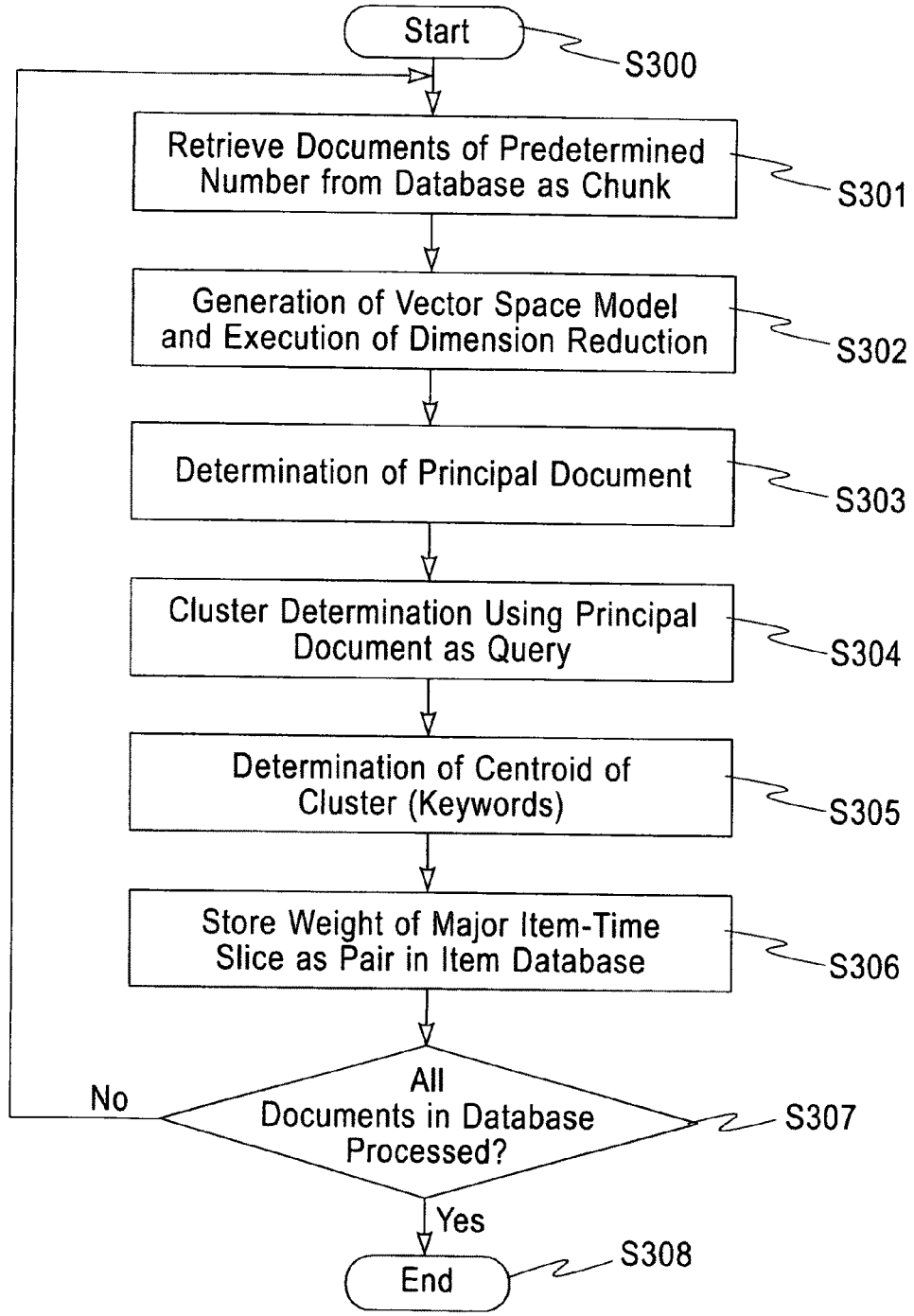
FIG. 3 shows the detailed embodiment for generating the centroid vector.

With reference to FIG. 3, the detailed embodiment for generating the centroid vector is described. The process of FIG. 3 starts at step S300 and in step S301 predetermined numbers of documents in the present time slice or chunk are retrieved from the document repository 112. In step S302, the vector space model is generated from the retrieved documents by the VSGP 104 and subsequently executes the dimension reduction by the DRP 106 as described in SECTION I.

In step S303, principal components of the dimension reduction matrix are determined. The term "principal components" refers herein to keywords which are recorded in the same line in the dimension reduction matrix and which are used to retrieve a principal document in the dimension reduction matrix. The preferred embodiment of the time slice or chunk and the principal components defined in the embodiment will be described in detail hereinafter.

In step S304, the cluster is determined using the principal document as a second query to the dimension reduction matrix; the process step being needed to determine the most probable document including the principal components in the line of the dimension reduction matrix and to determine the cluster relevant to the principal document. Briefly, the determination of the cluster depends on distances of the document-keyword vectors from the principal document and the cluster is defined by any appropriate rule or algorithm considering particular applications and properties of documents.

While many clustering algorithms use a randomized algorithm to select documents as initial seeds for clusters (e.g., the K-means algorithm and many proposed variations), the algorithm of the present embodiment is a more systematic and straightforward approach in which the principal components serve as queries. The retrieved documents may be expected to address major topics because of the fundamental property of principal component analysis, namely that the largest principal component points in the direction containing the most information about the database. The vector corresponding to the second largest principal component points in the direction containing the second-most amount of information about the database, and similarly for the subsequent principal components.

In one preferred embodiment of the clustering, the retrieved documents are sorted from the highest relevancy to the lowest relevancy. An updated approximation for the centroid is computed in a manner analogous to the process used for first approximation. The determination of the process for refining the approximation for the cluster may continue for several iterations until:

(1) the set of documents used for the approximation stabilizes (e.g., does not change or a percentage of the documents above a fixed threshold does not change) or (2) its value does not change or changes very little between two consecutive iterations.

In step S305, the method determines the centroid vectors; wherein the centroid vector is likely to be more dense (have more non-zero entries) than the average document vector. A preferred embodiment for speeding up computations of cluster determination, without compromising the quality of results are, comprises: using only the 30 highest ranked documents from the second query; computing the component-wise average of the 30 document vectors; setting the weights of all words less than a fixed threshold (e.g., 5%) to zero; ordering words from highest to lowest weight; and for each word, plotting its weight as a function of time. If the slope of the document rankings from the second query undergoes a sudden change before 30 documents, then it is appropriate to use only those documents represented before the sudden change to compute the component-wise average.

Further in step S306, the centroid vector or centroid vectors for different principal documents are stored in the item storage 114 with an identifier of the time slice or chunk. Further in step S307, the method determines whether or not all of the documents in the database have been processed (i.e., are there any time slices and/or the chunks remaining). In the determination of step S307, when the time slice or chunk remains to be processed, the method reverts to step S301 and repeats the processes described above. When no time slice or chunk remains, the method proceeded to step S308 to terminate execution of the process.

Figure 4:
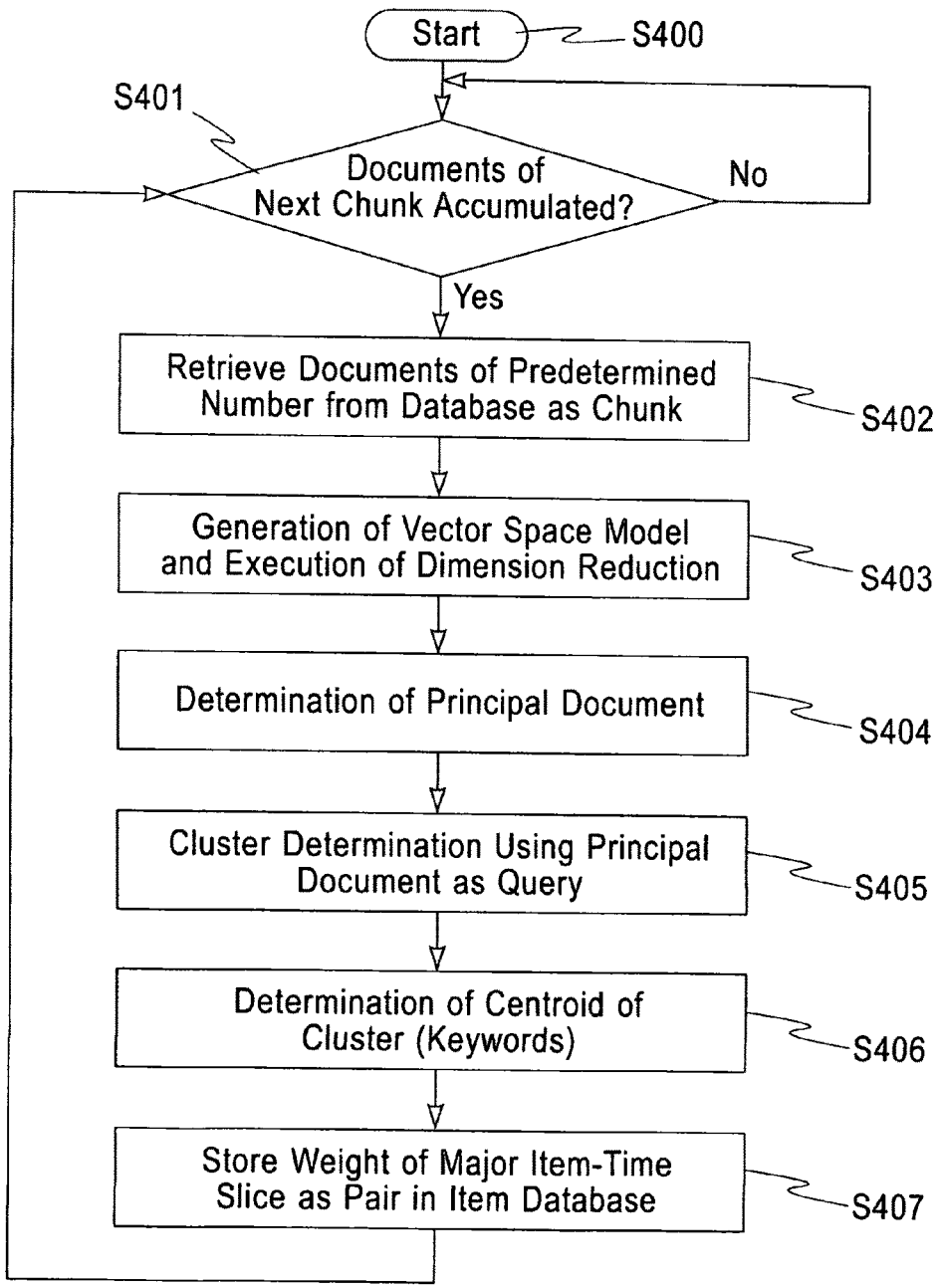
FIG. 4 shows the preferred embodiment of the method.

The embodiment described in FIG. 3 may be applied to a static database in which the documents have been already stored when the documents include time stamps, such that the time slice or chunk has been or can be defined for the documents. In the embodiment illustrated in FIG. 4, the documents are accumulated parallel to processing from the generation of the vector space model to the storage in the item storage. The process of FIG. 4 may be implemented as a daemon process or a service process. The method of FIG. 4 starts at step S400. In step S401, the method determines whether or not documents in the document database are accumulated enough to define a next time slice or chunk by the VSGP 104. When the VSGP 104 determines that a predefined threshold is met (e.g, as detailed above, a sufficient amount of data or an elapsed time period) then a new time slice or chunk is prepared. For example, through inter-process communication from the DAP 102, the VSGP 104 start to generate a new vector space model for the time slice or chunk to be processed. Then the method goes to the steps from S402 to S407 so as to execute the similar processes described in FIG. 3. The embodiment of FIG. 4 repeatedly monitors the acknowledgement from the DAP 102 until the VSGP 104 receives the affirmative acknowledgement for preparation of new time slice or chunk in the step S401. The process steps from step S402 to step S407 parallel the processes of FIG. 3, and the further detailed descriptions are omitted herein.

Section III: Detail Description of Information Processing

Figure 5:
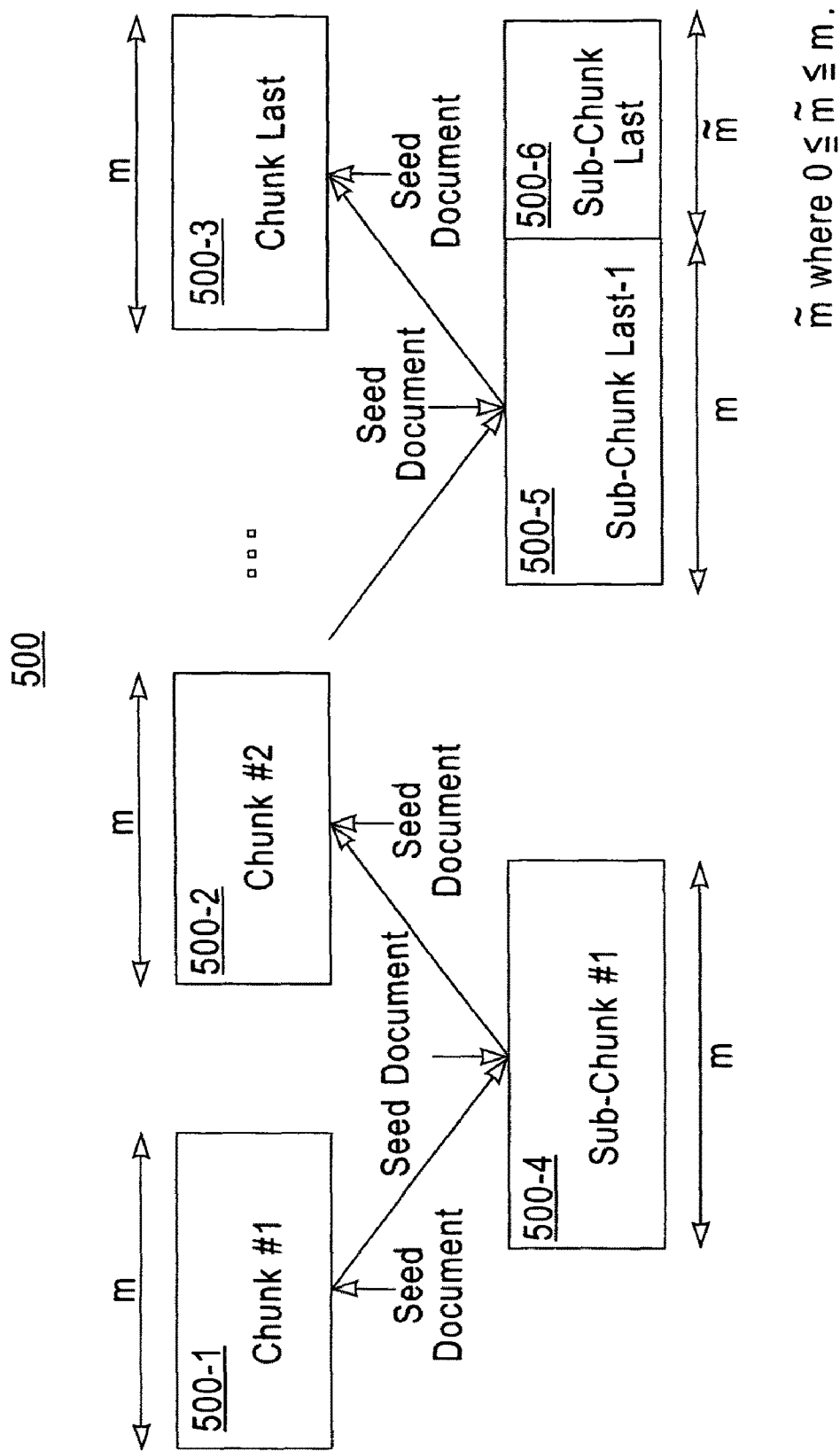
FIG. 5 shows the data structure of the time slice or chunk introduced in the present invention.

FIG. 5 shows the data structure of the time slice or chunk introduced in the present invention. The documents stored in the document database are recorded together with timestamps received by the DAP 102 so as to define the time slice or chunk. Alternatively, the documents may be stored without the timestamps and the time slice and/or chunk may be defined when predetermined numbers of the documents are accumulated, with the timestamp being applied when the number of the documents reaches the predetermined number. As detailed above, the present invention may adopt any other time slice or chunk creation method and should not be limited to the foregoing detailed implementations.

The documents are divided into the chunks in FIG. 5 and each of the chunks 500-1, . . . , 500-3 includes the same number of documents. In the embodiment of FIG. 5, therefore, the time duration for the chunks may be different from each other, which may be preferred when the information is accumulated by the DAP 102. The numbers of the document included in the chunk may be the same or different between the chunks. However, in order to certify statistical reliability of the dimension reduction, the chunk may optimally include the same number m of documents. In the embodiment using a predetermined number of documents, the last chunk 500-3 may have fewer or more documents than the other chunks depending on the total numbers of the documents in the document database.

In the preferred embodiment, the sub-chunks 500-4, 500-5, and 500-6 are also defined. The sub-chunks 500-4, 500-5, and 500-6 are used to support tracking of sequential chunks 500-1, 500-2, and 500-3 and are defined to have the documents of both of the adjacent chunks such as 500-1 and 500-2. The sub-chunk may be used such that tracking between the adjacent chunks is made possible even if particular keywords disappear between the adjacent chunks. The sub-chunks may be formed to share one half of the documents of the preceding chunk and one half of the next chunk sequentially defined in the database.

In the preferred embodiment of the present invention, the dimension reduction was executed in tiny document-keyword spaces and the dimension reduction was quickly and efficiently executed without a curse of dimension while making it possible to track the item evolution of the document repository.

When tracking of the items is desired, a simple tracking method may be provided using the overlapping time slices or chunks referred to as sub-chunks. Now, let $W_1$ denote the first chunk, or temporal window, let $W_2$ denote the second chunk, and let $W_i$ denote the i-th chunk or window (here i represents a positive integer value). For a retrieved topic, associated documents that are in the windows $W_1$ and $W_2$ are still maintained as the subject item though weights thereof may be different.

Since documents are numbered according to the order of their posting or accumulation, it is only necessary to check the document used as "seeds" (i.e., queries) to find similar documents in $W_2$, as shown in FIG. 5. When the topic continued to be an active item for the documents, then a non-empty set of documents posted during the latter half of $W_2$ is retrieved.

To track small shifts in the item from $W_1$ to $W_2$, the set of documents in $W_2$ related to the item is used to compute an approximate centroid vector by computing the moving average of the seed vectors. The vector average in the embodiment described may represent the evolution of the centroid vectors. In a more sophisticated application, the above centroid may be set as the first approximation to the centroid vectors as the query vector to retrieve a set of relevant documents and to compute a refinement for the approximate centroid. Analogous procedures may be applied to the time slices or chunks to track sets of documents on the specific item from time slices or chunks $W_i$ to $W_{i+1}$, and to track the approximate centroids.

Figures 6A, 6B:
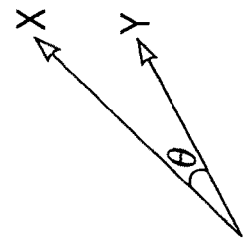
FIG. 6 shows embodiments of the document-keyword vectors (a) and the definition of the distance between the document-keyword vectors (b).

FIG. 6 shows embodiments of the document-keyword vectors (a) and the definition of the distance between the document-keyword vectors (b). Referring to FIG. 6, the keywords in the document are counted for every keyword to provide integer digital values of the keyword with weights as the document-keyword vector 602. In the next step, the document-keyword vector 602 is subjected to a Tf-idf process so as to modify the weights of each keyword using the algorithm described above, to produce the document-keyword vector 604, and then the modified weights are normalized to provide the normalized document-keyword vector 606.

In turn, the distance between the document-keyword vectors X and Y is defined herein as the inner product of the document-keyword vectors X and Y as shown in FIG. 6 (b), wherein $|X|$ is the norm of vector X, $|Y|$ is the norm of the vector Y, the vectors have been normalized so that $|X|=|Y|=1$, $\theta$ represents the angle between the vectors, $x_i$ and $y_i$ are elements of each of the vectors X and Y together consisting of n elements from i=1 to n.

Figure 7A:
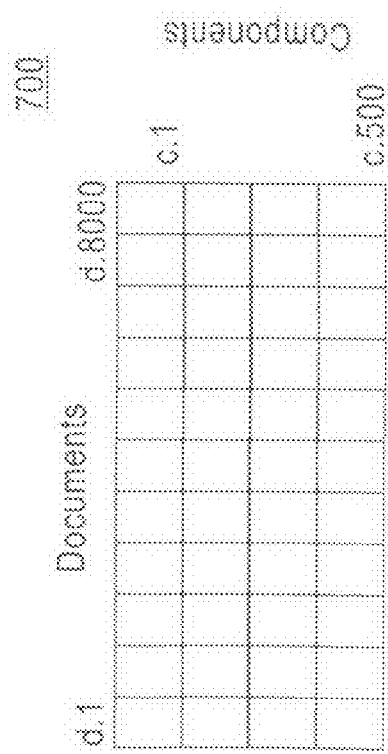
FIG. 7 shows the process for determining the principal components in the dimension reduction matrix 700.
Figure 7B:
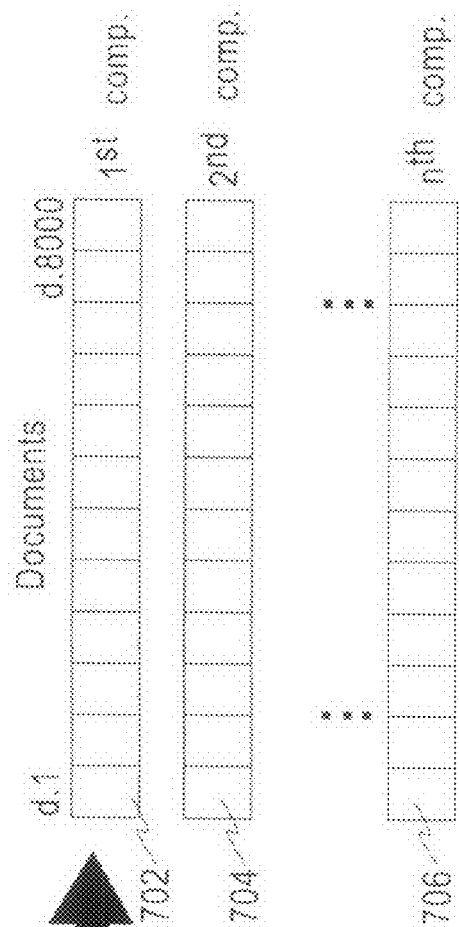

FIG. 7 shows the process for determining the principal components in the dimension reduction matrix 700. FIG. 7(a) shows the typical embodiment of the dimension reduction matrix 700 and FIG. 7(b) shows typical embodiments of principal components. The dimension reduction matrix 700 is computed from the document-keyword matrix consisting of document-keyword vectors shown in FIG. 6 (a) as columns with respect to series of the documents. Typical keyword numbers in the document-keyword vectors may range into the several thousands or more. The dimensions of the keywords are reduced into 500 keywords by the singular value decomposition through the method described above for the dimension reduction matrix 700 in the described embodiment.

The principal components are defined as the line of the dimension reduction matrix 700 and the principal components are identified as the first component, the second component, . . . , the n-th component with respect to the order of the keywords remaining through the dimension reduction in FIG. 7 (*a*). The order of the keywords through the dimension reduction may be arranged in the original order in the document-keyword matrix or, in more preferred embodiment, the keywords may be re-arranged in descending order with respect to the singular values. When the order of the keywords is arranged with respect to the singular values, the principal components readily refer to major keywords in the documents so that the principal components provide good relevancy to the major item in the documents.

Referring to FIG. 7 (*b*), the first component 702 comprises the top keywords in the line, and the second principal component 704 comprises the second line components, and the n-th principal component 706 comprises the n-th line components. In the present invention, each of the principal components may be used as a first query for determining the most relevant documents (and other high-ranking documents) which are referred to herein as principal documents.

Figures 8A, 8B:
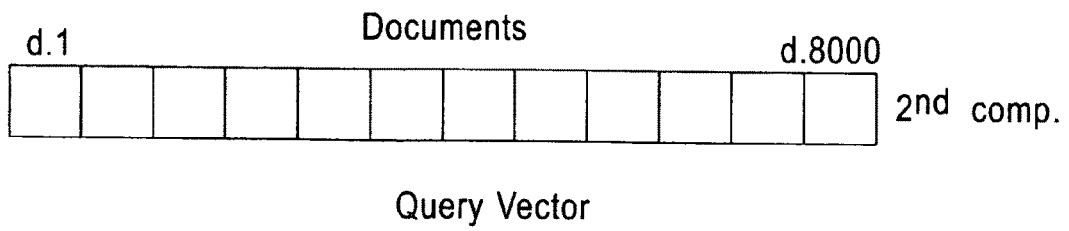
FIG. 8 shows further detail of the embodiments of the principal component.

In FIG. 8, further detail of the principal component is illustrated. The embodiment of FIG. 8 (*a*) corresponds to the second principal component 704 and comprises 8000 elements of the keywords which correspond to the chunk of the document. FIG. 8 (*b*) shows exemplary keywords 708 included in the second principal component such as energy, solar, etc. The numerals for each of the keywords are normalized weights for the corresponding keywords. The principal component is used as the first query to the document for determining the document most relevant to the principal component. The query process includes in the present embodiment the distance computation between the principal component and the dimension reduction matrix to extract the principal document (and other high-ranking documents). In an alternative embodiment, the query may be applied to the original document-keyword matrix.

FIG. 9 shows the result of the first query. The relevant documents are extracted from the documents as shown in the list 900 which may be tentatively stored in an adequate memory space in the computer system. The list 900 comprises the documents extracted by the query shown in FIG. 8, and the documents are sorted in descending order with respect to the distance from the principal component listed in the field 902. The distances listed in the field 902 are relatively low values in this step because the first query is the principal components selected across the documents included in the chunk. The list 900 further includes entries in field 904 which lists document identifiers such as document numbers. The document numbers may be provided when the documents are stored in the document database, or alternatively other identifiers may be provided depending on particular implementation architectures. The list 900 also includes the field 906 in which the title of the documents are listed for indexes of the documents.

According to the particular embodiment shown in FIG. 9, the second query vector is of the most relevant document 908 (corresponding to the document [#ID:2141]). The second query is again projected to the dimension reduction matrix so as to determine the clusters and the cluster centroids. When the second query is projected to the dimension reduction matrix, the distances to the relevant documents become higher values because the second query includes the important keywords in the cluster.

Figure 10A:
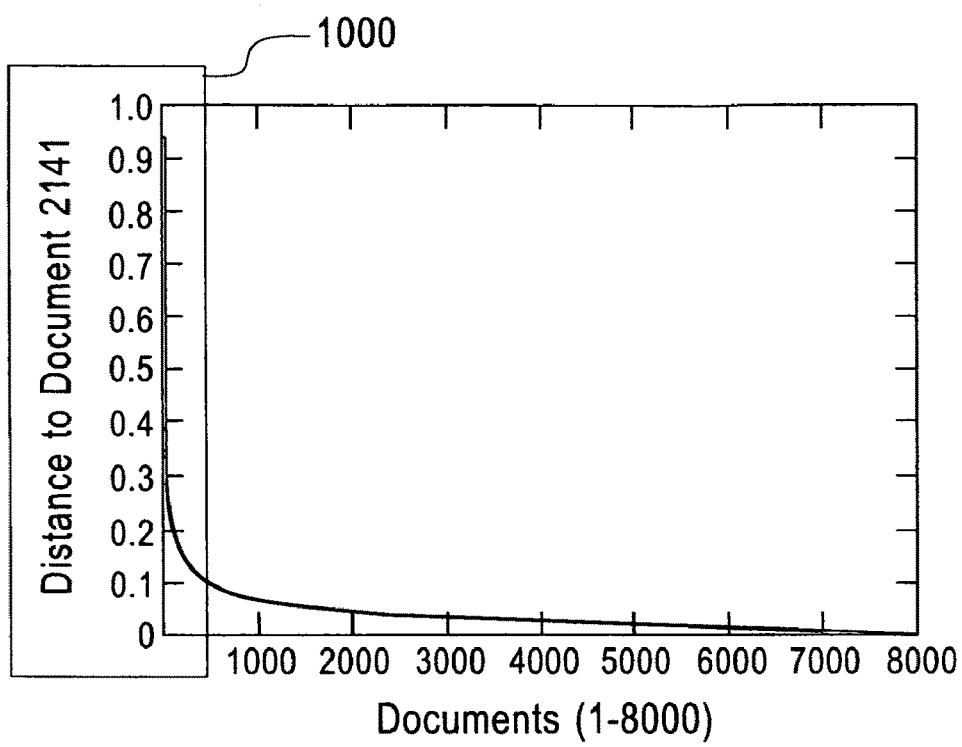
FIG. 10 shows the embodiment of results of the query.
Figure 10B:
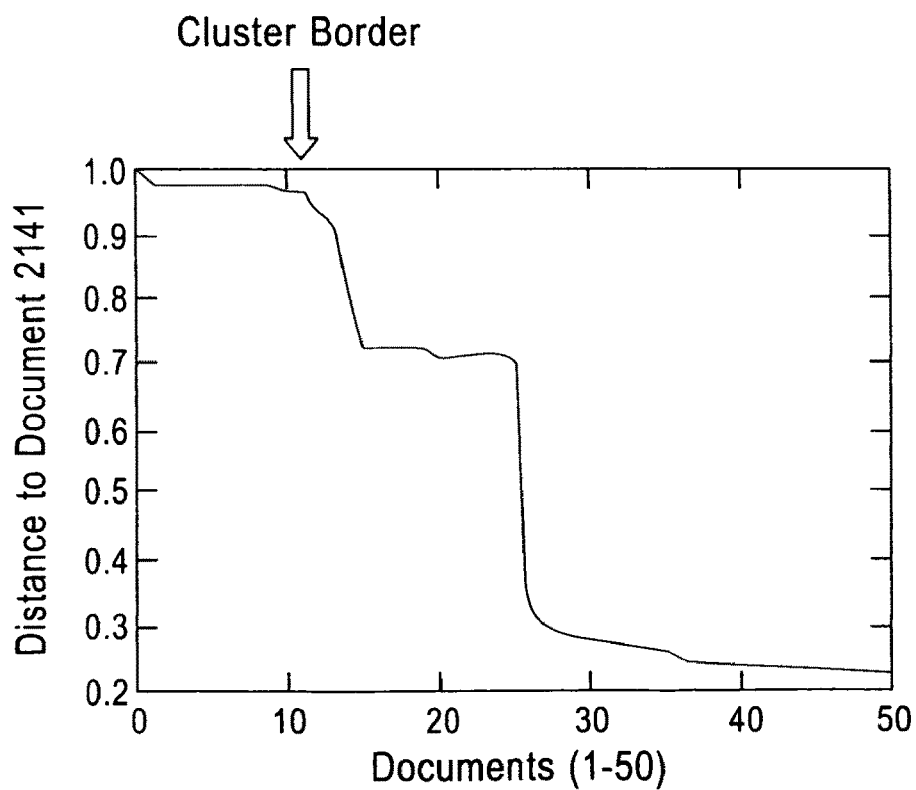

FIG. 10 shows the embodiment of results of the query. FIG. 10 (*a*) shows the global result within the chunk and FIG. 10 (*b*) shows the detailed results having higher relevancies to the second query, that is, keywords of the principal component. As shown in FIG. 10, the ordinates represent the relevancy derived from the distance and the abscissas are document numbers. As shown in FIG. 10 (*a*), the relevancy rapidly decreases from the query document referred to as zero to the last document referred to as 8000; the rapid decrease may represent sizes of the clusters. FIG. 10 (*b*) shows enlarged behavior of the decrease of the relevancy roughly indicated by the rectangle 1000. The enlarged decrement of the relevancy shows stepwise decrements and may suggest borders of the clusters with respect to the horizontal slice of the relevancy.

Thus, the cluster may be defined depending on their sliced relevancy; when a low slice level is adopted, less relevant documents are incorporated in the cluster, and when a high slice level is adopted, the result is clusters with fewer documents. Thence, there are some standards to determine the cluster. In the described embodiment, several strategies may be possible. In order to automate the process for identifying and approximating the cluster, the first strategy is to provide graphed similarity as shown in FIG. 10 from the greatest to the least relevance, as aligned from left-to-right.

Then the average of the keywords and weights thereof in the relevant documents may be used to compute an approximation for the centroid vectors of the cluster. In the embodiment shown in FIG. 10, for example, 30 documents may be considered to be clusters, but not limited thereto, other rules may be adopted in the present invention depending on particular application or characteristics of the relevancy change. For example, when the slope of the documents versus relevancy suddenly changes before 30 documents (as shown in FIG. 10 (*b*)), only the documents before the first sudden slope change are preferably used to determine the cluster and to compute the centroid vectors. Further in other embodiments, the cluster may be determined merely by the relevancy level such as 0.7 as shown in FIG. 10(*b*) or by document numbers from higher relevancies, etc.

Figure 11:
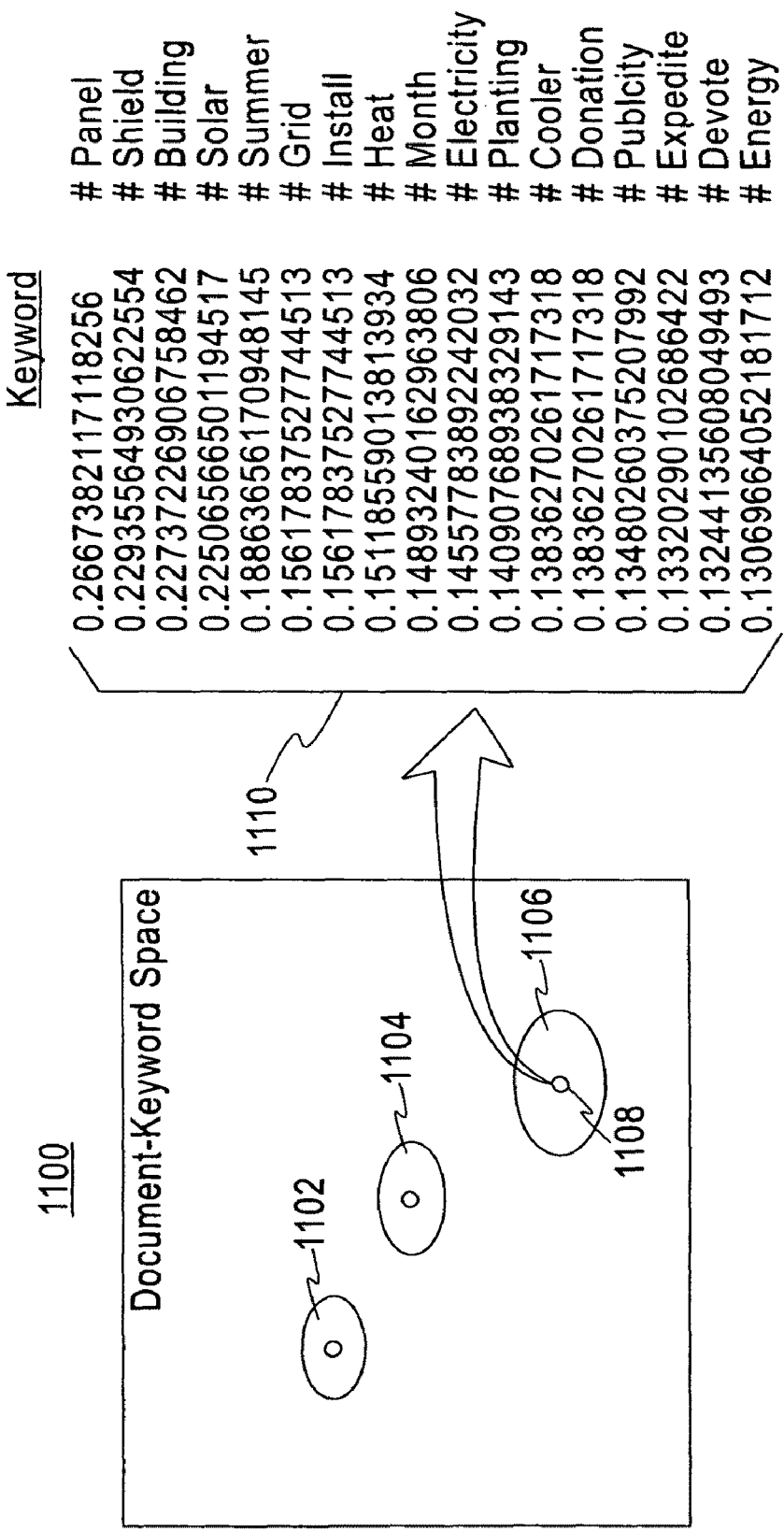
FIG. 11 schematically illustrates clusters in the document-keyword space and the elements of the centroid vectors.
Figures 12, 13:
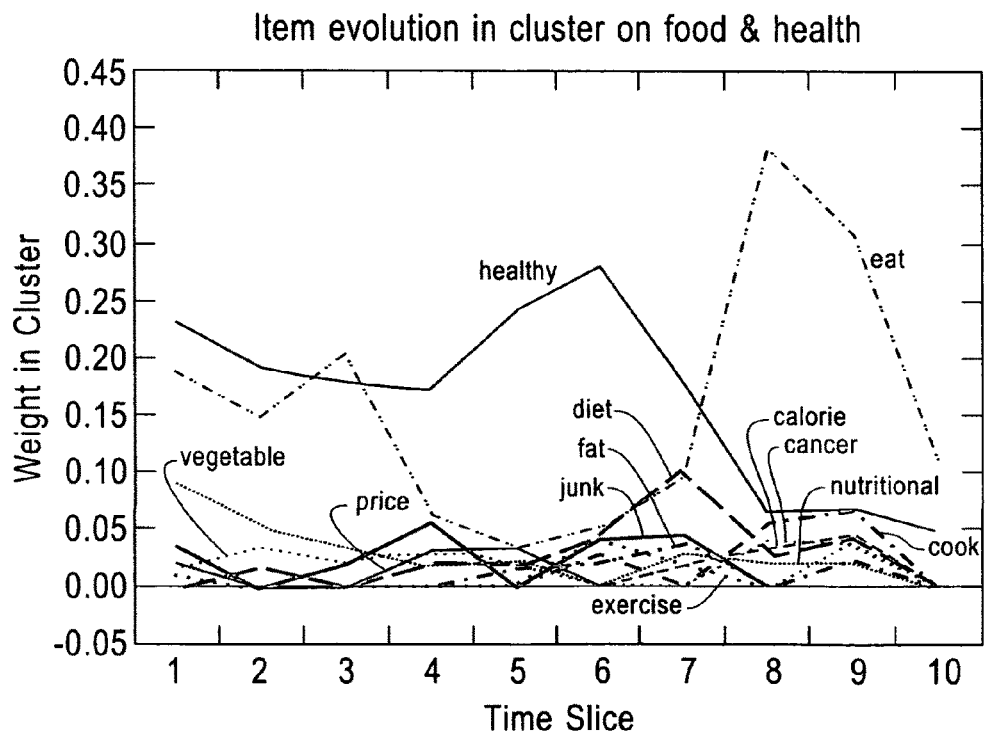
FIG. 12 shows the centroid vectors which may be stored for each chunks as the list 1200.
FIG. 13 shows the results for cluster on food and health and tracking of all of the items.

FIG. 11 schematically illustrates clusters in the document-keyword space (dimension reduced) 1100 and the elements of the centroid vectors. The clusters 1102-1106 are defined according to the procedure described in FIG. 10 for different principal documents which are indicated with filled circles as shown in FIG. 11 (*a*). Here, the elements 1110 of the centroid vector 1108 of the cluster 1106 are shown in FIG. 11 (*b*) together with weights thereof. The clusters may be determined for every principal document and every time slice or chunk and hence, the centroid vectors may be stored for each chunk as the list 1200 shown in FIG. 12. In the embodiment of FIG. 12, centroid vectors for the cluster corresponding to the second principal documents are presented; however, another embodiment may include more centroid vectors corresponding to each of the clusters. The list 1200 may be stored in memory spaces such as the item repository 114 with appropriate formats such as CVS, comma-space, or other application oriented formats in the computer system for the analysis of the item analyzer part 110.

GUIs and means of plotting results may be adopted among various database applications and spreadsheet applications which are commercially available and for which the further details will not be explained herein.

There may be variations on the describe embodiment hereinabove. Such variations are, for example, but not limited thereto, those listed as follows:

(1) chunk sizes (e.g., smaller, larger or non-uniform sizing);
(2) extent of chunk overlap (less than or greater than 50%, non-uniform size overlaps); or
(3) alternative criteria for chunking (e.g., posting during temporal windows, country of origin).

Section IV: Experimental (IV-1) Computer Implementation

The computer system implemented with the present invention was ThinkPad (trademark) T40 with a PENTIUM (trademark) M processor with 1.5 GHz clock with a 1 GB RAM. The operating system thereof was WINDOWS (trademark) XP. The program was described in JAVA (trademark). In the above implementation, the computation of the documents was completed within 30 minutes.

(IV-2) Database Preparation

The database used the present method for identification and tracking of clusters and the flow of items using text data was generated during the first phase of the 2006 IBM Innovation Jam (I-Jam). The data were comprised of 37,037 postings (mails) by more than 53,000 participants around the globe over a 78 hour period (from Jul. 24, 2006 7:00 A.M. EST to Jul. 27, 2006. 11:00 A.M. EST). Each document represented an opinion freely input by an employee or family member of IBM Research or 67 selected external organizations. 200 to 300 of the posted opinions were in a language other than English. The contents of postings other than those posted in English were omitted from the analysis.

Participants were requested to submit postings on four categories as follows:

1. Going Places—transforming travel, transportation, recreation and entertainment;
2. Finance and Commerce—the changing nature of global business and commerce;
3. Staying Healthy—the science and business of well-being; and
4. A Better Planet—balancing economic and environmental priorities.

Documents were sorted from oldest to newest according to the timestamp of their posting. The data set was chunked into time slices of 8,000 consecutive document postings. In the implementation, sub-chunks were defined for each time slice to have a 4,000 document overlap with the previous time slice (and consequently, a 4,000 document overlap with the subsequent time slice).

To construct a vector space model for the sample database, each 8,000 documents of the I-Jam dataset was chunked as time slices using the standard procedure for keyword extraction and stemming described in standard textbooks on the subject e.g., Belew (op. cit.) and more specifically, Talent (Neff et al. (op. cit.)) which is a parser developed at IBM Research, that extracts keywords, deletes common stopwords, and conducts parts-of-speech tagging. The keywords were only considered single word tokens (nouns, verbs, and adjectives). The keywords set was confirmed that the set keywords extracted followed a Zipfian distribution. Next, rare and overly frequent keywords were omitted from the keyword set. In the implementations, the threshold was less than 10 documents for the lower bound, and the threshold was more than 5%-7% of documents, depending on the shape of the log-log Zipfian curve for the upper bound. A standard type of term frequency inter-document frequency (tf-idf) weighting was applied, followed by normalization Manning and Schuetze (op. cit.). A typical result from vector space modeling of a 8,000 document time slice is 3136 keywords, leading to a 8000-by-3136 document-attribute matrix with density 1%-2%.

In order to examine the results, two trial sets were selected; one set was a set of documents that addresses food and health issues and another set was a set of documents that addresses money and security. Documents in the overlap between the first and second time slice or chunk were used to track how the topic evolved in the second time slice. The time slices or chunks were divided into 10 time slices or chunks in which each of the time slices or chunks included 8000 documents, with the exception of the last time slice or chunk.

The 12 prominent items (keywords) in the centroid vectors from the 10 time slices of I-Jam data: "junk", "vegetable", "cancer", "diet", "eat", "calorie", "healthy", "cook", "exercise", "fat", "nutritional", and "price", in the first trial set and four keywords with relatively high weight were considered: "cash", "payment", "security", and "signature", in the second trial set. After the tracking experiments, the texts of the original documents (i.e., I-Jam postings) were compared to the results so as to check whether or not shifts in the keyword weights did indeed correspond to changes in the discussion within documents.

(IV-3) Results

Figure 14:
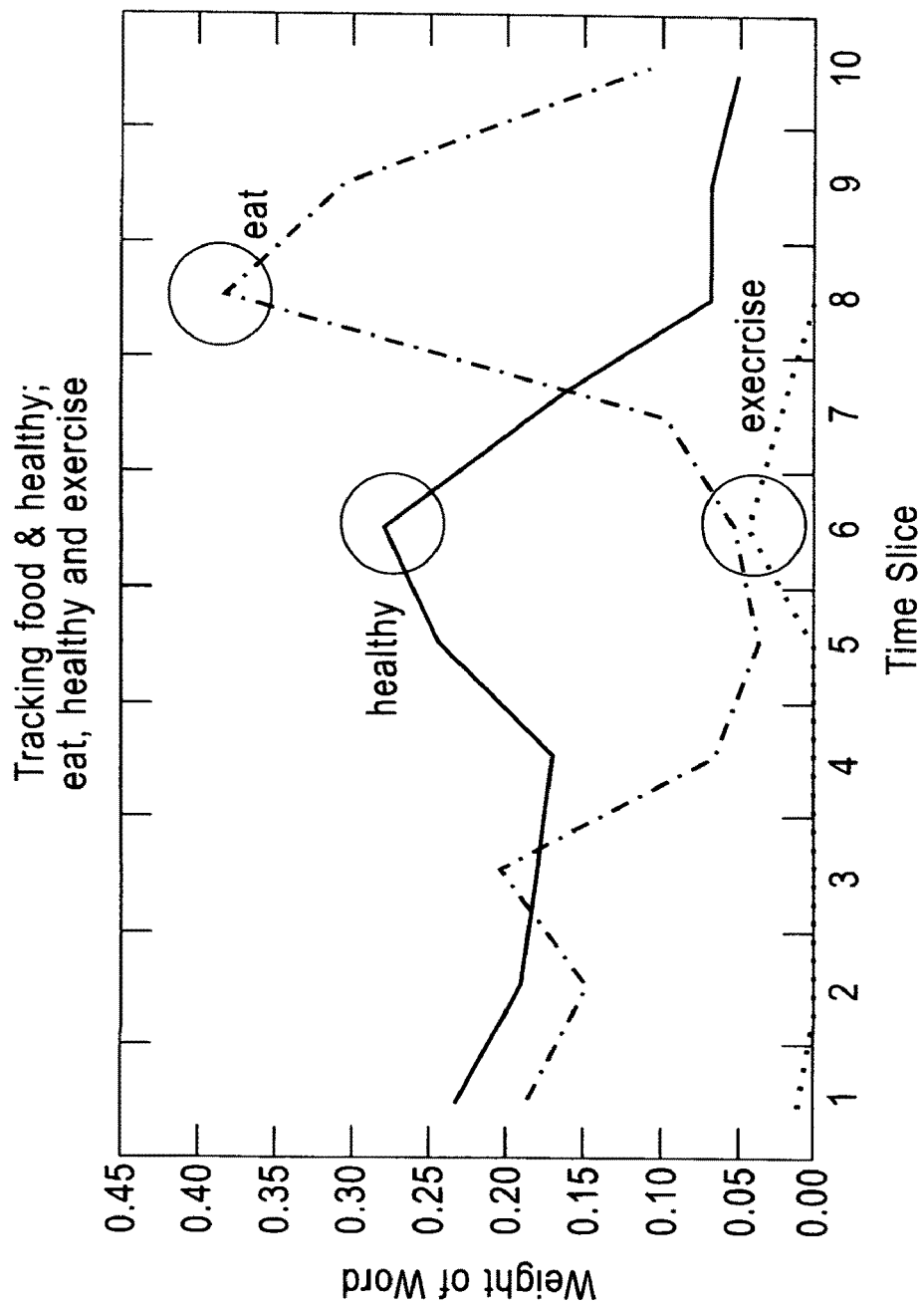
FIG. 14 shows the results for detailed tracking of items on eat, healthy and exercise.
Figure 15:
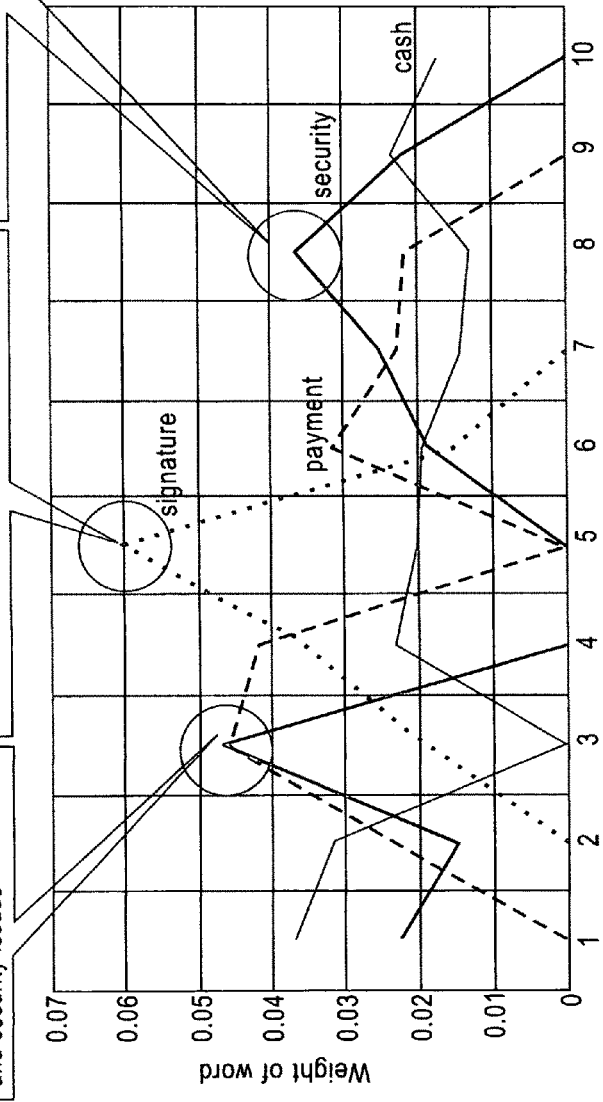
FIG. 15 shows another result for the cluster including the items of cash, payment, security, and signature.

The results are shown in FIGS. 13-1. FIG. 13 shows the results for clustering on food and health and tracking of all of the items. FIG. 14 shows the results for detailed tracking of items "eat", "healthy", and "exercise" in the food and health result. FIG. 15 shows the result for clustering on money and security and tracking was focused on the items "cash", "payment", "security" and "signature". Only in FIG. 15, are the texts of postings displayed.

As shown in FIG. 13, the cluster on food and health comprises 12 prominent items such as "junk", "vegetable", "cancer", etc. The items clearly show time dependent weight changes between the first chunk and the 10-th chunk. Then, the items eat, healthy and exercise are independently selected so as to examine the mutual relationship therebetween. The result is shown in FIG. 14 and a clear relationship is presented; the users posting to food and health are largely interested in "healthy" and "eat" rather than "exercise", and the item "eat" is shown in the negative direction when the item "healthy" and the item "exercise" are major concerns of the postings.

FIG. 15 shows another result for the cluster including the items of "cash", "payment", "security", and "signature". To each of the peaks in FIG. 15, representative postings are listed together. The item "security" and the item "payment" first create the peaks and then in the 5-th chunk, the item "signature" creates another peak while the item "security" and the item "payment" become minor items, leading to the conclusion that items of "payment" and "cash" induced the posting or opinions about the item "signature". Then the major items of the postings show the evolution to the postings including items "payment", "cash" and "security".

As described hereinabove, it has been understood that the present invention improves information retrieval of the documents which are loosely related and accumulated without particular regulations for formats with high efficiency and high performance. The present system, method, and the program make it possible to achieve prompt semantic analysis of documents which are accumulated or stored almost in real time as well as in static databases.

While the present invention is described hereinabove by using the embodiments and examples illustrated in the drawings, it should be appreciated by persons skilled in the art that the true scope of the present invention should only be limited by appended claims and the present invention may be implemented with alternative embodiments, with modifications, and with omission of non-essential features.

The invention claimed is:

1. A system for information clustering, said system comprising;
   a central processing unit (CPU) for executing parts;
   a data accumulation part for accumulating and clustering documents in a document repository, said documents including loosely related clusters between said documents being time sliced so as to define chunks of said documents;
   a vector space generation part for generating document-keyword vectors, said document-keyword vectors consisting of sparse numeral values depending on presence of keywords in said documents;
   a dimension reduction part for reducing dimensions of said keywords to create a dimension reduction matrix of said document-keyword matrix;
   a centroid vector determination part for generating a centroid vector of said cluster, said cluster being retrieved from said document-keyword vector using a principal component in a same line of said dimension reduction matrix, said centroid vectors being defined from keywords and weight of documents within said cluster; and
   an item repository for storing said centroid vectors together with said keywords and said weights of said centroid vector.

2. The system of claim 1, wherein said centroid vector determination part retrieves a principal document in said document using said principal component as a first query vector and subsequently retrieves documents defining said clusters using said principal document as a second query vector.

3. The system of claim 1, wherein said vector space generation part executes dimension reduction to each of said chunks of said dimension reduction matrix and said centroid vector generation part generates clusters for every chunk of said dimension reduction matrix.

4. The system of claim 1, wherein said system further comprises an item analyzer part for analyzing evolution of items with respect to said chunk of said document and for information tracking.

5. A computer executable method for information clustering, said method making a computer having a central processing unit (CPU) execute the steps of;
   accumulating and clustering documents in a document repository, said documents including loosely related clusters between said documents being time sliced so as to define chunks of said documents;
   generating document-keyword vectors, said document-keyword vectors consisting of sparse numeral values depending on presence of keywords in said documents;
   reducing dimensions of said keywords to create a dimension reduction matrix of said document-keyword matrix; and
   generating a centroid vector of said cluster, said cluster being retrieved from said document-keyword vector using a principal component in a same line of said dimension reduction matrix, said centroid vectors being defined from keywords and weight of documents within said cluster; and
   storing said centroid vectors in an item repository together with said keywords and said weights of said centroid vector.

6. The method of claim 5, said method further comprising the steps of;
   retrieving a principal document in said document using said principal component as a first query vector and subsequently retrieving documents defining said clusters using said principal document as a second query vector.

7. The method of claim 5, said method further comprising the steps of;
   executing dimension reduction to each of said chunks of said dimension reduction matrix and
   generating clusters for every chunk of said dimension reduction matrix.

8. The method of claim 5, said method further comprising the steps of;
   analyzing evolution of items with respect to said chunk of said document and for information tracking.

9. A system for information tracking, said system comprising;
   a central processing unit for executing parts;
   a data accumulation part for accumulating and clustering documents in a document repository, said documents including loosely related clusters between said documents being time sliced so as to define chunks of said documents;
   a vector space generation part for generating document-keyword vectors, said document-keyword vectors consisting of sparse numeral values depending on presence of keywords in said documents;
   a dimension reduction part for reducing dimensions of said keywords to create a dimension reduction matrix of said document-keyword matrix;
   a centroid vector determination part for generating a centroid vector of said cluster, said cluster being retrieved from said document-keyword vector using a principal component in a same line of said dimension reduction matrix, said centroid vectors being defined from keywords and weight of documents within said cluster;
   an item analyzer part for analyzing evolution of items with respect to said chunk of said document and for information tracking; and
   an item repository for storing said centroid vectors together with said keywords and said weights of said centroid vector.

10. The system of claim 9, wherein said centroid vector determination part retrieves a principal document in said document using said principal component as a first query vector and subsequently retrieves documents defining said clusters using said principal document as a second query vector.

11. A computer executable method for information tracking, said method making a computer having a central processing unit execute the steps of;
    accumulating documents in a document repository, said documents including loosely related clusters between said documents being time sliced so as to define chunks of said documents;
    generating document-keyword vectors, said document-keyword vectors consisting of sparse numeral values depending on presence of keywords in said documents;
    reducing dimensions of said keywords to create a dimension reduction matrix of said document-keyword matrix; and
    generating a centroid vector of said cluster, said cluster being retrieved from said document-keyword vector using a principal component in a same line of said dimension reduction matrix, said centroid vectors being defined from keywords and weight of documents within said cluster;

storing said centroid vectors in an item repository together with said keywords and said weights of said centroid vector; and analyzing evolution of items with respect to said chunk of said document and for information tracking.

12. The method of claim 11, said method further comprising the steps of;

retrieving a principal document in said document using said principal component as a first query vector and subsequently retrieving documents defining said clusters using said principal document as a second query vector.

13. A non-transitory computer executable program medium storing a program for making a computer execute a method for information clustering, said method making said computer execute the steps of;

accumulating and clustering documents in a document repository, said documents including loosely related clusters between said documents being time sliced so as to define chunks of said documents;

generating document-keyword vectors, said document-keyword vectors consisting of sparse numeral values depending on presence of keywords in said documents;

reducing dimensions of said keywords to create a dimension reduction matrix of said document-keyword matrix; and generating a centroid vector of said cluster, said cluster being retrieved from said document-keyword vector using a principal component in a same line of said dimension reduction matrix, said centroid vectors being defined from keywords and weight of documents within said cluster; and storing said centroid vectors in an item repository together with said keywords and said weights of said centroid vector.

14. The program medium of claim 13, wherein said method further comprises the steps of;

retrieving a principal document in said document using said principal component as a first query vector and subsequently retrieving documents defining said clusters using said principal document as a second query vector.

15. The program medium of claim 13, wherein the method further comprises the steps of;

executing dimension reduction to each of said chunks of said dimension reduction matrix and generating clusters for every chunk of said dimension reduction matrix.

16. The program medium of claim 13, wherein the method further comprises the steps of;

analyzing evolution of items with respect to said chunk of said document and for information tracking.

17. A non-transitory computer executable program medium storing a program for making a computer execute a method for information tracking, said method making said computer execute the steps of;

accumulating documents in a document repository, said documents including loosely related clusters between said documents being time sliced so as to define chunks of said documents;

generating document-keyword vectors, said document-keyword vectors consisting of sparse numeral values depending on presence of keywords in said documents;

reducing dimensions of said keywords to create a dimension reduction matrix of said document-keyword matrix; and generating a centroid vector of said cluster, said cluster being retrieved from said document-keyword vector using a principal component in a same line of said dimension reduction matrix, said centroid vectors being defined from keywords and weight of documents within said cluster;

storing said centroid vectors in an item repository together with said keywords and said weights of said centroid vector; and analyzing evolution of items with respect to said chunk of said document and for information tracking.

18. The program medium of claim 17, said method further comprising the steps of;

retrieving a principal document in said document using said principal component as a first query vector and subsequently retrieving documents defining said clusters using said principal document as a second query vector.

\* \* \* \* \*